United States Patent
Eckerdt

(10) Patent No.: US 8,919,656 B2
(45) Date of Patent: Dec. 30, 2014

(54) MEMORY BUTTON MOUNT

(75) Inventor: George Eckerdt, Fishers, NY (US)

(73) Assignee: Key Systems, Inc., Victor, NY (US)

( * ) Notice: Subject to any disclaimer, the term of this patent is extended or adjusted under 35 U.S.C. 154(b) by 0 days.

(21) Appl. No.: 13/483,592

(22) Filed: May 30, 2012

(65) Prior Publication Data

US 2012/0305655 A1   Dec. 6, 2012

Related U.S. Application Data

(60) Provisional application No. 61/492,390, filed on Jun. 2, 2011.

(51) Int. Cl.
  *G06K 19/06* (2006.01)
  *G06K 19/077* (2006.01)
  *A47G 29/10* (2006.01)

(52) U.S. Cl.
  CPC .............. *G06K 19/077* (2013.01); *A47G 29/10* (2013.01)
  USPC ........................................... 235/492; 439/66

(58) Field of Classification Search
  USPC ........................................................ 235/492
  See application file for complete search history.

(56) References Cited

U.S. PATENT DOCUMENTS

| | | | |
|---|---|---|---|
| 3,058,083 A * | 10/1962 | Schneider | 439/82 |
| 3,205,468 A * | 9/1965 | Henschen | 439/79 |
| 4,192,567 A * | 3/1980 | Gomolka | 439/320 |
| 4,950,856 A * | 8/1990 | Valenzona | 200/526 |
| 5,086,773 A * | 2/1992 | Ware | 607/2 |
| 5,801,628 A | 9/1998 | Maloney | |
| 5,831,827 A * | 11/1998 | Fekete et al. | 361/728 |
| 5,848,541 A * | 12/1998 | Glick et al. | 70/278.3 |
| 5,904,590 A * | 5/1999 | Fekete | 439/500 |
| 6,043,666 A * | 3/2000 | Kazama | 324/755.05 |
| 6,232,876 B1 | 5/2001 | Maloney | |
| 6,239,393 B1 * | 5/2001 | Hansen | 200/276 |
| 6,341,962 B1 * | 1/2002 | Sinclair | 439/66 |
| D456,852 S | 5/2002 | Maloney | |
| 6,388,885 B1 * | 5/2002 | Alexander et al. | 361/760 |
| 6,392,543 B2 | 5/2002 | Maloney | |
| 6,424,260 B2 | 7/2002 | Maloney | |
| 6,707,380 B2 | 3/2004 | Maloney | |
| 6,722,893 B2 * | 4/2004 | Li et al. | 439/66 |
| 6,746,252 B1 * | 6/2004 | Scott | 439/70 |
| 6,781,390 B2 * | 8/2004 | Kazama | 324/755.05 |
| 7,677,901 B1 * | 3/2010 | Suzuki et al. | 439/66 |
| 2001/0020896 A1 | 9/2001 | Higuchi | |
| 2002/0028704 A1 * | 3/2002 | Bloomfield et al. | 463/1 |
| 2005/0258245 A1 * | 11/2005 | Bates et al. | 235/451 |
| 2008/0258869 A1 | 10/2008 | Ognjenovic | |

* cited by examiner

*Primary Examiner* — Christopher Stanford

(57) ABSTRACT

A mounting spring coil is made to grip and releasably hold a cylindrical periphery of a memory button while transmitting an ID effectively. A memory button held in a coil of the mounting spring can support objects such as tags and keys that are identified by the memory button to account for removal and replacement of the objects being secured.

18 Claims, 3 Drawing Sheets

MEMORY BUTTON MOUNT

RELATED APPLICATIONS

This application relates to and replaces provisional application No. 61/492,390 filed 2 Jun. 2011.

TECHNICAL FIELD

Memory button identification and mounting of keys and other security items

BACKGROUND

Memory buttons or Dallas ibuttons afford an inexpensive way to provide an ID associated with a security object. The security objects can be keys, cards, and other small and lightweight objects deserving security, such as small medicinal packages of liquids, pills, and capsules. The ID can be read electrically with a signal wire paired with a neutral wire for easy identification.

The difficulty comes in packaging and mounting the objects to easily read a memory button associated with each object. Prior art suggestions for mounting or packaging memory buttons and security objects have been expensive and cumbersome, resulting in a need for a simpler and less expensive mount.

SUMMARY

Embodiments described in this application meet the need for a memory button mount that is simple, compact, durable, inexpensive, and effective in providing electrically readable IDs for security objects. A good example of objects deserving security measures are keys. Memory buttons can be attached directly to the heads of keys or to tags that are permanently connected to keys to give each key or group of keys an ID. Then the button itself can mount and support the keys or the tag attached to keys so that each memory button can be read electrically and can thereby account for the removal and replacement of keys.

The mount for the memory button is preferably a coil spring having a gripping coil that can frictionally and releasably hold onto a cylindrical contact surface of a memory button. Such a coil spring can also provide electrical communication with the cylindrical periphery of the memory button. The spring grip on the memory button is strong enough to hold a tag, and one or more keys, or other objects that can be arranged in a security box. The memory button is thus made to serve two purposes: one being an electrically accessible ID associated with each security object, and the other being a mounting function accomplished in cooperation with a coil spring having a gripping coil that fits tightly around a perimeter of a memory button.

A lighter weight contact spring coil can be arranged within the gripping coil to make electrical contact with a plane face of the memory button so that presence or absence of the memory button and its associated security object can be tracked electrically. Securing the gripping spring and the contact spring to a surface of a circuit board having electrically conductive paths can be done so that a computer or microprocessor communicating with the circuit board can readily detect the presence or absence of any memory button.

Keys are not the only security object that can be accounted for with a memory button mount such as proposed in this application. Other objects that are sufficiently compact and sufficiently lightweight to be attached to memory buttons or to tags mounting memory buttons can afford the same sort of security as provided for keys.

DRAWINGS

DETAILED DESCRIPTION

Figure 1:
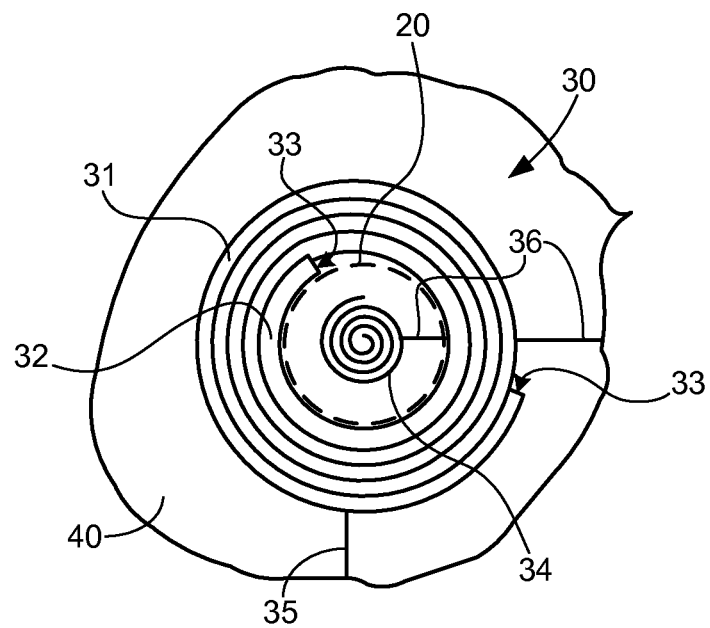
FIG. 1 is a partially schematic plan view of a coil spring mount showing a gripped memory button in broken lines.
Figure 2:
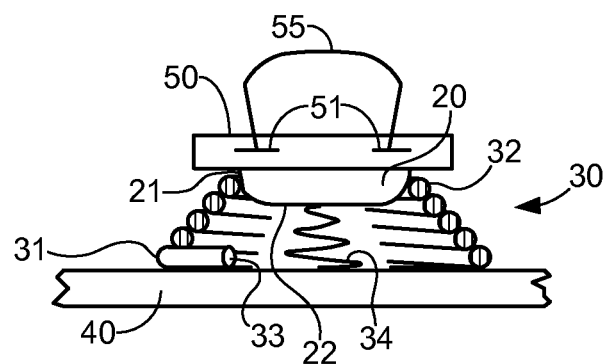
FIG. 2 is a partially cut-away and partially schematic view of a coil spring holder for a memory button attached to a key tag.
Figure 3:
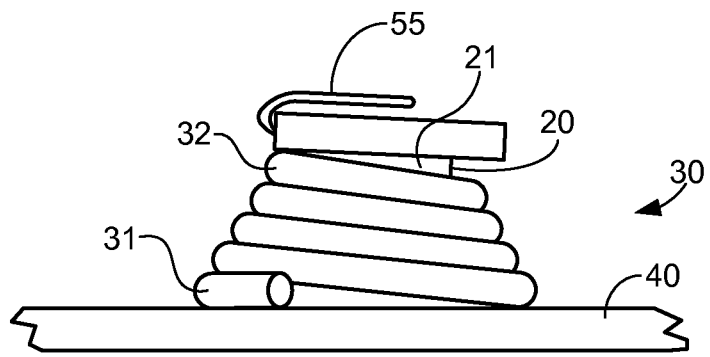
FIG. 3 is a side elevational view of the coil spring, memory button, and key tag of FIG. 2.

The illustrated embodiments involve a coil spring gripper that releasably holds a memory button, and possibly an asset secured to the memory button, in a configuration especially suitable for keys as the objects to be secured. The coil spring holder is illustrated in FIGS. 1-3 and the key tag is illustrated in FIGS. 2-6. Many variations are possible for mounting memory buttons directly on the heads of keys or on other objects to be secured.

Coil gripping spring 30 preferably has a conical shape as illustrated, with a base coil 31 having a larger ID than a gripping coil 32 arranged at a top of spring 30. Top coil 32 can then grip memory button 20 as illustrated in broken lines in FIG. 1. Spring 30 is preferably made of a conductive metal, such as music wire so that it electrically communicates with a cylindrical periphery 21 of memory button 20. It can be made in many configurations, including cylindrical, but the illustrated conical shape is preferred for stability.

The ends 33 of spring 30 can be cut off square, as shown in FIG. 1, or can be machined to tapers that more closely fit a plane surface. Experience has shown that this is not necessary, however. Even cut off square, as shown in FIG. 1, gripping coil 32 surrounds about ¼ or about 270 degrees of the cylindrical surface 21 of memory button 20. This affords a grip strong enough to releasably support both memory button 20 and tags or objects secured to memory button 20. The grip of spring 30 on memory button 20 is aided by the fact that memory button 20 does not need to be disposed parallel with a support surface 40 to which base coil 31 is secured. Spring 30, in the simple illustrated configuration, can be made on a fourslide machine, which is preferred for keeping the manufacturing expense low.

A support surface 40 is preferably a circuit board having established conductive paths 35 and 36. There are countless ways that electrically conductive paths can be designed on a circuit board 40 or other support to read identities from an array of memory buttons 20. They all require a single signal line, paired with a neutral line.

A contact spring 34, of much lighter gauge than gripping spring 30, is preferably mounted on circuit board 40 within base coil 31 to extend up to a region within gripping coil 32 to electronically contact a plane face surface 22 of memory button 20. Contact spring 34 thus contacts an electrode of memory button 20 while gripping spring 30 contacts another electrode of memory button 20 so that ID numbers of memory button 20 can be accessed simply.

Spring 30, in addition to providing electrical contact with a cylindrical perimeter 21 of memory button 20, also grips and releasably holds memory button 20 by the frictional grip of upper coil 32. The springiness of the wire of spring 30 allows upper coil 32 to expand slightly when memory button 20 is pressed into place within the wrap of coil 32. This wrap extends around more than half of the cylindrical surface of memory button 20, and preferably about 270 degrees, to hold memory button 20 securely. Coils of spring 30 preferably contact each other in an unflexed state so that pushing button 20 into gripping coil 32 is resisted by the underlying coils to force gripping coil 32 to expand slightly in diameter to receive button 20. This assures a secure and reliable grip on button 20 that remains releasable for removing a secured object.

For security of keys, memory button 20 is preferably secured to a tag 50 that holds a wire 55 on which a key 60 can hang. Tag 50 has slits 51 at an upper end to receive barbed ends of wire 55. A key 60, mounted on wire 55 is secured to tag 50 once the barbed ends of wire 55 are inserted into slits 51 from which the wire cannot be extracted. Memory button 20 is secured to one face of tag 50, and wire 55 is bent to extend into a space on a side of tag 50 opposite button 20.

Figure 4:
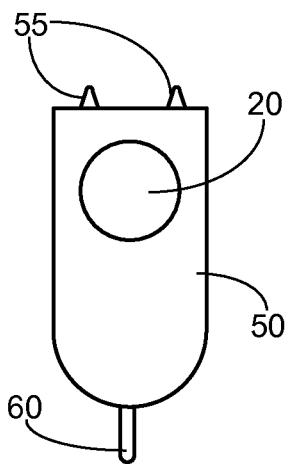
FIG. 4 is a side elevational view of the key tag of FIGS. 2 and 3.
Figure 5:
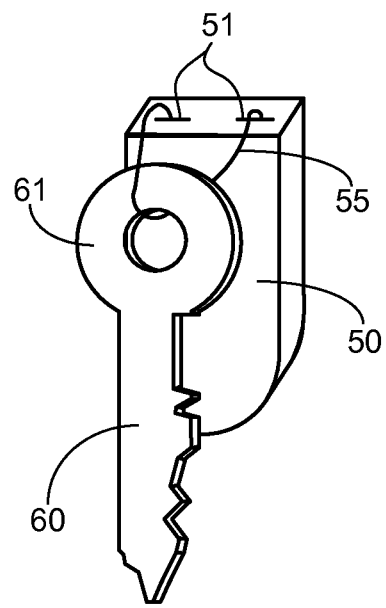
FIG. 5 is a partially perspective view of a key hanging on a wire loop of the key tag of FIGS. 2, 3, and 4.
Figure 6:
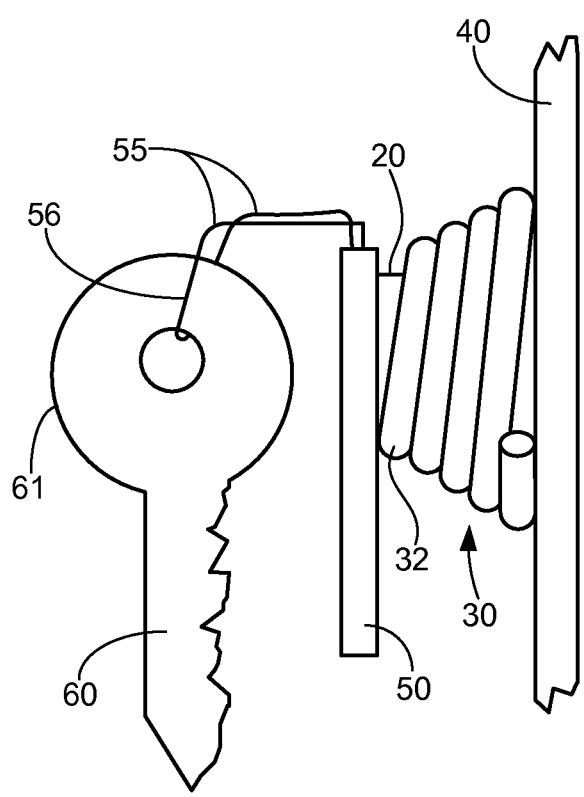
FIG. 6 is a side elevational view of the combination of a key, key tag, gripping spring, and circuit board to show how compactly a key can be mounted.

With circuit board 40 oriented vertically and coil spring 30 oriented horizontally, tag 50 can hang vertically from the grip afforded by memory button 20 in the gripping coil 32 of spring 30. This disposes hanging wire 55 near the top of tag 50 with a loop 56 disposed on a side of tag 50 opposite button 20 where the head 61 of key 60 is disposed above a bottom end 52 of tag 50. This is shown in FIGS. 4-6. This arrangement makes compact storage for an array of keys so that many more keys and tags can be mounted in a security box than if the tags were hung with the wire end downward. This would extend the hanging wire 55 below the bottom of tag 50, with key 60 extending even farther below tag 50 where it would require much more hanging space.

Altogether, skillful variations and combinations on the illustrated embodiments can significantly reduce the expense of providing memory button identities to keys and other objects. This can make increased security affordable to many applications that deserve increased security.

What is claimed is:

1. A memory button mount, comprising:
  a) a mounting spring having coils in substantially full contact in an unflexed state that proceed successively from a base coil secured to a support surface to a gripping coil spaced apart from the support surface to form a conical shape, wherein:
    the gripping coil is configured to releasably grip a cylindrical contact surface of the memory button, and a free length of the mounting spring is substantially equal to a solid length of the mounting spring; and
  b) a contact spring configured to engage a plane contact surface of the memory button, and wherein the contact spring is arranged within the base coil of the mounting spring.

2. The memory button mount of claim 1, wherein:
  the base coil is electrically secured to the support surface, the support surface being a circuit board; and
  the contact spring is electrically secured to the circuit board.

3. A memory button mount, comprising:
  a) a mounting spring having coils that proceed successively from a base coil having a first diameter to a gripping coil having a second diameter that is smaller than the first diameter, wherein:
    the gripping coil is configured to releasably grip a cylindrical contact surface of the memory button; and
    a free length of the mounting spring is substantially equal to a solid length of the mounting spring and successive coils of the mounting spring contact each other in an unflexed state; and
  b) a contact spring configured to engage a plane contact surface of the memory button, and wherein the contact spring is arranged within the base coil of the mounting spring.

4. The memory button mount of claim 3, wherein the coils of the mounting spring form a conical shape.

5. The memory button mount of claim 3, wherein:
  the base coil is electrically secured to a circuit board; and
  the contact spring is electrically secured to the circuit board.

6. A memory button mount, comprising:
  a mounting spring having a substantially conical shape formed by coils that proceed successively from a base coil to a gripping coil with a pitch at each point in the mounting spring that is no greater than a diameter at the respective point in the mounting spring of a wire from which the mounting spring is formed, wherein:
    the gripping coil is configured to releasably grip a cylindrical contact surface of the memory button; and
    the coils of the mounting spring, including the base coil and the gripping coil, contact each other in an unflexed state, an external surface of each coil tangentially touching a respective external surface of at least one other coil when viewed in a cross section taken substantially parallel to a longitudinal axis of the mounting spring.

7. The memory button mount of claim 6, wherein the base coil is electrically secured to a circuit board.

8. The memory button mount of claim 6, further comprising a contact spring configured to engage a plane contact surface of the memory button, and wherein the contact spring is arranged within the base coil of the mounting spring.

9. The memory button mount of claim 8, wherein:
  the base coil is electrically secured to a circuit board; and
  the contact spring is electrically secured to the circuit board.

10. A memory button mount, comprising:
  a mounting spring having coils that proceed successively from a base coil to a gripping coil, wherein:
    the gripping coil is configured to releasably grip a cylindrical contact surface of the memory button; and
    the coils of the mounting spring, including the base coil and the gripping coil, contact each other in an unflexed state, a pitch at each point of the mounting spring being no greater than a diameter at the respective point of the mounting spring of a wire used to form the mounting spring.

11. The memory button mount of claim 10, wherein coils of the mounting spring form a conical shape.

12. The memory button mount of claim 10, wherein the base coil is electrically secured to a circuit board.

13. The memory button mount of claim 10, further comprising a contact spring configured to engage a plane contact surface of the memory button, and wherein the contact spring is arranged within the base coil of the mounting spring.

14. The memory button mount of claim 13, wherein:
  the base coil is electrically secured to a circuit board; and
  the contact spring is electrically secured to the circuit board.

15. A system for mounting a memory button, comprising:

a) a tag coupled to the memory button, such that a cylindrical contact surface and a plane contact surface of the memory button are accessible on a first face of the tag, and wherein the tag has an upper end and a bottom end;

b) a wire loop having first and second ends configured to be coupled to the upper end of the tag to trap a key on the wire loop;

c) a mounting spring extending from a support surface substantially perpendicular thereto, the mounting spring having a plurality of coils in substantially full contact in an unflexed state including a base coil attached to the support surface and a gripping coil spaced apart from the support surface, a pitch at each point of the mounting spring being no more than a diameter at the respective point of the mounting spring of a wire used to form the mounting spring, the gripping coil being configured to releasably retain an external cylindrical surface of the memory button; and d) wherein, when the memory button is retained in the gripping coil of the mounting spring, the wire loop comprises a central region extending into a space on a side of the tag opposite the first face of the tag.

16. The system of claim 15, wherein a head of a key trapped on the wire loop is at least partially disposed above the bottom end of the tag when the cylindrical contact surface of the memory button is being gripped by the gripping coil.

17. The system of claim 15, wherein the coils of the mounting spring form a conical shape.

18. The system of claim 15, further comprising a contact spring configured to engage the plane contact surface of the memory button, and wherein the contact spring is arranged within the base coil of the mounting spring.

* * * * *